(12) United States Patent
Blueml

(10) Patent No.: US 10,619,540 B2
(45) Date of Patent: Apr. 14, 2020

(54) EXHAUST SYSTEM COMPONENT

(71) Applicant: Faurecia Emissions Control Technologies, Augsburg (DE)

(72) Inventor: Alfred Blueml, Augsburg (DE)

(73) Assignee: Faurecia Emissions Control Technologies, Germany GmbH (DE)

( * ) Notice: Subject to any disclaimer, the term of this patent is extended or adjusted under 35 U.S.C. 154(b) by 0 days.

(21) Appl. No.: 16/358,784

(22) Filed: Mar. 20, 2019

(65) Prior Publication Data

US 2019/0292958 A1 Sep. 26, 2019

(30) Foreign Application Priority Data

Mar. 22, 2018 (DE) .................. 10 2018 106 834

(51) Int. Cl.
*F01N 3/022* (2006.01)
*B23K 26/262* (2014.01)
(Continued)

(52) U.S. Cl.
CPC ....... *F01N 3/0222* (2013.01); *B01D 46/0005* (2013.01); *B01D 53/94* (2013.01); *B21C 37/08* (2013.01); *B21C 37/0826* (2013.01); *B23K 26/242* (2015.10); *B23K 26/262* (2015.10); *B23K 26/32* (2013.01); *B23K 33/006* (2013.01); *B23K 33/008* (2013.01); *F01N 3/2842* (2013.01); *F01N 3/2853* (2013.01); *F01N 13/18* (2013.01); *F01N 13/1877* (2013.01); *B01D 2265/04* (2013.01); *B01D 2279/30* (2013.01); *B23K 2101/006* (2018.08); *B23K 2101/06* (2018.08); *B23K 2101/12* (2018.08); *B23K 2103/05* (2018.08); *F01N 2330/04* (2013.01); *F01N 2450/02* (2013.01); *F01N 2450/22* (2013.01)

(58) Field of Classification Search
CPC ............ F01N 2330/04; F01N 2450/02; F01N 3/0222; F01N 13/1877; F01N 3/2842
USPC .......... 422/180; 29/890; 285/288.1; 228/171
See application file for complete search history.

(56) References Cited

U.S. PATENT DOCUMENTS 2,234,450 A 3/1941 Quarnstrom
3,563,713 A * 2/1971 Rudd ................... B23K 20/085
228/107

(Continued)

FOREIGN PATENT DOCUMENTS

CN 103358043 A 10/2013
DE 19731987 A1 1/1999
(Continued)

OTHER PUBLICATIONS

German Search Report dated Feb. 5, 2019 in connection with the German priority application.

(Continued)

*Primary Examiner* — Tom P Duong
(74) *Attorney, Agent, or Firm* — Carlson, Gaskey & Olds, P.C.

(57) ABSTRACT

An exhaust system component for an exhaust system of an internal combustion engine of a motor vehicle comprises a substrate which is held in a substantially cylindrical housing. The cylindrical housing has a housing jacket which comprises a metal sheet bent about a cylinder axis. The ends of the metal sheet oriented in the circumferential direction relative to the cylinder axis form a joint connected with a weld seam. The weld seam is spaced apart from an inner surface of the housing jacket and the ends each have a bevel at least in sections.

20 Claims, 4 Drawing Sheets

(51) Int. Cl.
*B01D 46/00* (2006.01)
*B01D 53/94* (2006.01)
*F01N 3/28* (2006.01)
*F01N 13/18* (2010.01)
*B23K 33/00* (2006.01)
*B23K 26/242* (2014.01)
*B21C 37/08* (2006.01)
*B23K 26/32* (2014.01)
*B23K 101/06* (2006.01)
*B23K 103/04* (2006.01)
*B23K 101/12* (2006.01)
*B23K 101/00* (2006.01)

(56) References Cited

U.S. PATENT DOCUMENTS

| | | | | |
|---|---|---|---|---|
| 4,833,295 | A * | 5/1989 | Locker | F16H 41/24 |
| | | | | 219/121.13 |
| 4,949,895 | A * | 8/1990 | Sugiyama | F16L 9/02 |
| | | | | 228/175 |
| 2004/0013581 | A1* | 1/2004 | Burnette | B01D 53/885 |
| | | | | 422/179 |
| 2004/0170541 | A1 | 9/2004 | Flehmig et al. | |
| 2005/0022964 | A1 | 2/2005 | Thevenon | |
| 2010/0275443 | A1 | 11/2010 | Kroner et al. | |
| 2011/0171079 | A1* | 7/2011 | Garcia Gomez | F01N 3/2842 |
| | | | | 422/168 |

FOREIGN PATENT DOCUMENTS

| | | |
|---|---|---|
| EP | 1445443 A1 | 8/2004 |
| GB | 758124 A | 9/1956 |
| WO | 2011088852 A1 | 7/2011 |

OTHER PUBLICATIONS

European Search Report dated May 14, 2019 in connection with the European counterpart application.

* cited by examiner

EXHAUST SYSTEM COMPONENT

CROSS-REFERENCE TO RELATED APPLICATIONS

This application is a U.S. non-provisional application claiming the benefit of German Patent Application No. 10 2018 106 834.4, filed on Mar. 22, 2018, which is incorporated herein by its entirety.

FIELD OF INVENTION

The invention relates to an exhaust system component, in particular a catalytic converter or a particle filter, for an exhaust system of an internal combustion engine of a motor vehicle.

BACKGROUND OF THE INVENTION

Conventional exhaust system components, in particular a catalytic converter or a particle filter, for an exhaust system of an internal combustion engine of a motor vehicle have a substrate which is held in a substantially cylindrical housing. The housing has a housing jacket which comprises a metal sheet bent about a cylinder axis, the ends of which oriented in the circumferential direction relative to the cylinder axis form a joint connected with a weld seam.

In this connection, by the term "cylindrical" it is meant that the housing has the shape of a general cylinder. A footprint or cross-section of the cylinder can therefore be circular, but does not have to be. In the same way, cylindrical housings with elliptical, four-cornered, e.g. rectangular, footprints or footprints of any shape are also meant.

Such an exhaust system component is known, for example, from DE 10 2005 029 163 A1. There, the two ends oriented in the circumferential direction are arranged in a lap joint and welded together. A mechanically stable and fluid-tight housing thus forms.

The lap joint leads to a section of metal sheet always lying between the weld seam and the substrate or other materials arranged within the housing. Damage to the substrate as well as to the other materials is thus effectively prevented during the production of the weld seam.

Because of the high cost pressure in the automotive industry, it is generally also sought in the field of exhaust systems and components thereof to produce these as cost-effectively as possible.

The object of the invention is therefore to further improve exhaust system components of the type named at the beginning with respect to the production costs. Furthermore, they are to be reliable in their functioning and have a long lifespan.

SUMMARY OF THE INVENTION

An exhaust system component includes a weld seam that is spaced apart from an inner surface of a housing jacket that comprises a metal sheet, and wherein ends of the metal sheet each have a bevel at least in sections. The bevels face each other within the joint. The weld seam therefore has a spacing from the inner surface of the housing jacket greater than zero. In other words, the metal sheet is not penetration-welded. The weld seam preferably extends over less than 90%, in particular over less than 80% of a thickness of the metal sheet. The substrate arranged within the housing jacket and/or other materials present there is or are thereby protected from the influences of the welding process by which the weld seam is produced. In particular, the welding energy source, for example a welding torch or a laser, thus does not act directly on the substrate and the other materials. An indirect, thermal effect of the welding process on the substrate and the other materials is shielded by the area of the housing jacket which is arranged between the weld seam and the inside of the housing. Damage and other negative influences can thus be kept away from the substrate and the other materials, with the result that a reliable functioning and a long lifespan of the substrate as well as of the other materials present within the housing results.

The bent metal sheet has two ends oriented in the circumferential direction, which each comprise an end face oriented substantially in the circumferential direction. By a bevel it is meant here that there is an intended and substantial deviation of at least one section of the end face from a plane running radially relative to the cylinder axis. The section of the end face is therefore inclined with respect to the radial plane. End faces or sections thereof which, in an idealized, theoretical view, run in the radial plane but deviate therefrom because of tolerances in the practical implementation, are not meant as bevels within the meaning of the invention. The same applies to deviations from the radial plane which result from side effects of a manufacturing process performed in the radial direction. In particular, end faces and sections thereof which form through flow phenomena, are thus not meant as bevels. Such flow phenomena occur e.g. when metal sheet is trimmed or punched.

Because of the bevels, the weld seam is thus additionally shielded with respect to the substrate and other materials present within the housing. This is true, in particular, in comparison with end faces running substantially in the radial direction, which form the joint. The substrate and the other materials are therefore also thereby protected from the influences of a welding process. This is true to a particular degree when a welding energy source used to create the weld seam acts mainly in the radial direction.

The joint of the bevelled ends is therefore a modified butt joint, wherein the ends of the metal sheet to be welded together are not offset with respect to each other in the direction of a sheet thickness. This reduces the material requirement for the production of the housing jacket, in particular, in comparison with the known lap joint. Consequently, the housing jacket can be produced particularly cost-effectively. In addition, a low weight of the exhaust system component is thus guaranteed.

The metal sheet is preferably a steel sheet, in particular a stainless-steel sheet. In this connection, a sheet thickness is preferably less than 0.5 mm. For example, the metal sheet can be 0.2 mm thick. Such metal sheets are sometimes also called foils.

In the field of catalytic converters and particle filters, the substrate can also alternatively be described as a monolith.

Viewed in the axial direction, a joint contour of one of the ends is preferably a negative contour of a joint contour of the respective other end. The ends thus, in particular, rest flat against each other. The weld seam can thereby at each end cooperate with a comparatively large area of the metal sheet, with the result that the ends of the metal sheet are mechanically stable and are thereby reliably connected to each other.

Each of the bevels can form an angle of at least 15°, preferably of at least 20°, with a radial plane of the housing jacket. Such bevels are comparatively simple to produce. In addition, it turns out that, in these angle ranges, a particularly good compromise is achieved between a mechanically stable connection of the ends via the weld seam and an effective protection of the substrate and of the other materials present within the housing from the influences of a welding process.

According to an embodiment, the bevels are chamfers oriented in opposition and running over the entire thickness of the metal sheet. The chamfers run, for example, at an angle of 45°. Also, 30° chamfers or 60° chamfers are likewise possible. Such bevels can be produced particularly efficiently.

For example, the bevels can be produced in the course of trimming the metal sheet. Then, instead of being cut off in the direction of a sheet thickness, the metal sheet is cut off at an angle thereto. The metal sheet can be trimmed using a laser.

When cutting the metal sheet with a laser, the advantage results that the desired angle can be adhered to with very great accuracy. This is important, in particular, because the effect according to the invention is established already at very small angles, in particular already at angles from 5°.

Alternatively, one of the bevels is a chamfer running over only a part of a thickness of the metal sheet. The chamfer is thus provided on only one edge of an end face of the metal sheet. The bevel thus represents only one part of an end face of the metal sheet. The remaining parts of the end face run substantially in a radial plane. Such chamfers can also be produced simply and cost-effectively.

The bevel facing the bevel formed as a chamfer can be arranged on a metal sheet extension, in particular wherein a radial thickness of the metal sheet extension corresponds substantially to a radial height of the chamfer. The metal sheet extension can also be described as a projection or edge. Compared with the sheet thickness, a thickness of the metal sheet extension is reduced. In particular, the end contour comprising the metal sheet extension represents a negative of the end contour comprising the chamfer.

Advantageously, the weld seam is a laser weld seam, in particular wherein the weld seam runs substantially over the entire axial length of the housing jacket. Laser weld seams can be produced quickly and repeated accurately. In particular, the associated laser welding process is particularly well-suited to the mass production of components. When the weld seam runs over the entire axial length of the housing jacket, it guarantees a mechanically stable connection of the ends. At the same time, a substantially fluid-tight housing jacket can thus be created. This makes for a reliable functioning as well as a long lifespan of the exhaust system component.

According to a variant, the substrate is mounted on the housing jacket via a mounting mat, in particular wherein the mounting mat rests substantially flat against both the substrate and the housing jacket. For one thing, the mounting mat serves to dampen vibrations. Vibrations occurring during operation of the exhaust system component are thus kept away from the substrate or dampened with respect to the substrate. In addition, tolerances occurring between the substrate and the housing jacket can be compensated for via the mounting mat, with the result that the substrate is held firmly and reliably in the housing jacket.

The mounting mat preferably rests against the substrate interlayer-free, in particular binder-free. The structure of the exhaust system component is thus particularly simple. In addition, through the omission of the binder, costs are saved compared with known exhaust system components.

Furthermore, the metal sheet of the housing jacket can, in a dimension corresponding to the housing jacket circumference, be individually adapted to the mounting mat. In particular, the metal sheet is individually adapted in its dimension corresponding to the housing jacket circumference to a weight and/or a weight per unit area of the mounting mat. In the fully assembled state of the exhaust system component, the substrate is held in the housing via the mounting mat. The mounting mat can thereby be compressed. The dimension of the metal sheet corresponding to the housing jacket circumference can therefore be adapted to a thickness or average thickness of the mounting mat. This dimension of the metal sheet can likewise be determined taking into consideration the compression properties of the mounting mat. Characteristics of the mounting mat, which indirectly include the thickness as well as the compression properties, are the weight and the weight per unit area of a mounting mat with a pre-determined length and width. The weight as well as the weight per unit area can be determined simply and reliably in a production environment. Through the individual adaptation of the metal sheet to the mounting mat, the substrate can be held in the housing with the best possible utilization of the vibration damping properties and/or of the tolerance compensation properties of the mounting mat.

A preferred embodiment provides that, in the radial direction, the housing jacket has a substantially constant thickness, in particular wherein the constant thickness corresponds to a sheet thickness. As already mentioned, the ends of the metal sheet thus overlap only within the sheet thickness. In particular, these do not form a lap joint in the conventional sense.

The weld seam can, in an area resting against an axial end of the housing jacket, run inclined with respect to the cylinder axis and/or, in a central area spaced apart from the axial ends of the housing jacket, run substantially along the cylinder axis. The weld seam runs inclined e.g. by 45° with respect to the cylinder axis. With respect to forces acting in the circumferential direction, the areas in which the weld seam runs inclined with respect to the cylinder axis are thus particularly stable. Breaking off or cracking of the end of the weld seam is thus prevented in particular. A long lifespan of the exhaust system component thereby results.

The metal sheet of the housing jacket is preferably individually adapted to the substrate in a dimension corresponding to the housing jacket circumference. Within the framework of the production of the exhaust system component, one or more dimensions of the substrate are therefore measured. In particular, an extent of the substrate is determined. From this, an extent of the metal sheet is determined, taking into consideration a possibly present mounting mat. The metal sheet is then cut corresponding to the dimensions and possibly the properties of the mounting mat. The housing jacket thus has a desired circumference when the two ends of the metal sheet form the joint. As already mentioned, the ends do not form a lap joint.

Generally speaking, the metal sheet can therefore be adapted individually to the substrate. An individual adaptation to the mounting mat can be effected at the same time, as described above.

Advantageously, the substrate is held in the housing substantially by a radial compression force originating from the housing jacket. This compression force results from the metal sheet individually adapted to the substrate and/or the mounting mat. All further work steps which serve to fix the substrate in the housing jacket can thus be dispensed with. In particular, no bonding and/or no additional shaping of the metal sheet is required. The exhaust system component can thus be produced simply and cost-effectively.

BRIEF DESCRIPTION OF THE DRAWINGS

The invention is explained below with reference to various embodiment examples which are shown in the attached drawings.

FIG. 2 shows another example cross-section in FIG. 2b), FIG. 2 shows another example cross-section in FIG. 2c)

DETAILED DESCRIPTION

Figure 1:
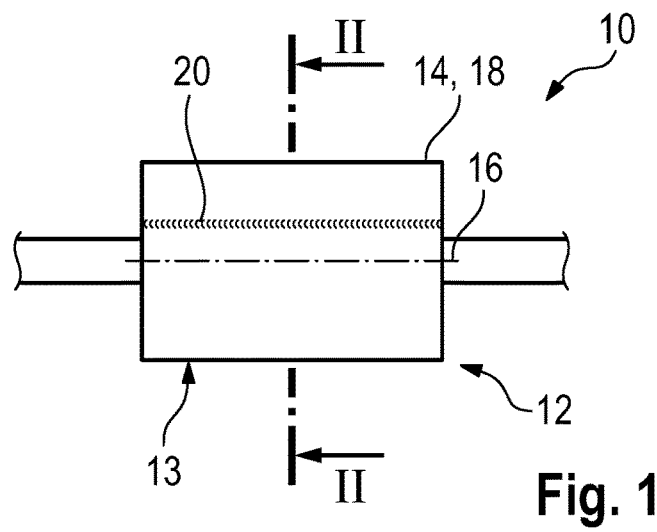
FIG. 1 shows an exhaust system component according to the invention in a top view.

FIG. 1 shows an exhaust system 10 of an internal combustion engine of a motor vehicle. The exhaust system 10 comprises an exhaust system component 12 which, in the present case, is a catalytic converter or a particle filter.

The exhaust system component 12 has a substantially cylindrical housing 13 with a housing jacket 14 which comprises a metal sheet 18 bent about a cylinder axis 16.

Figure 2:
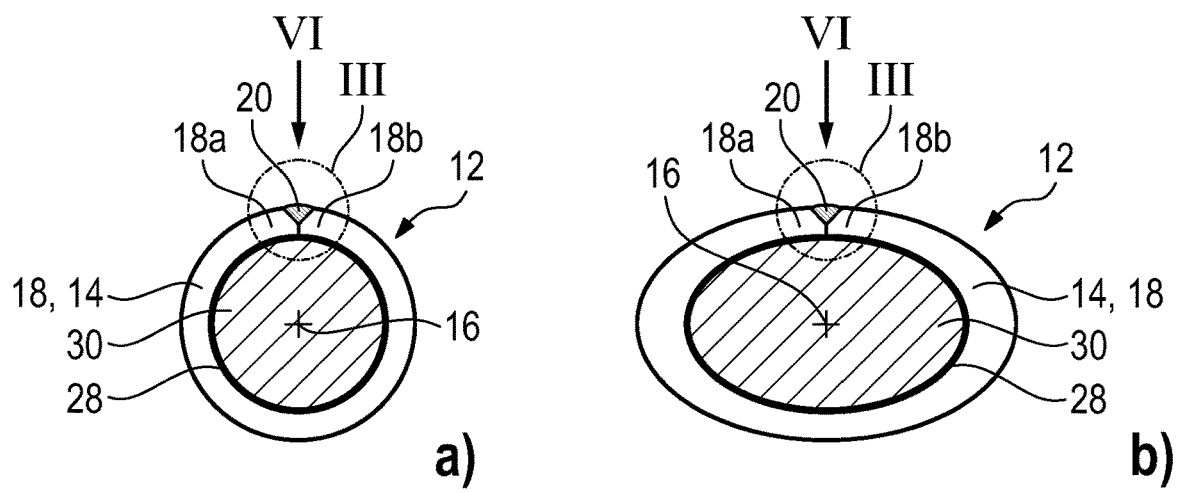
FIG. 2 shows one example in FIG. 2a) of a cross-section of the exhaust system component from FIG. 1 along the line II-II.
Figure 2:
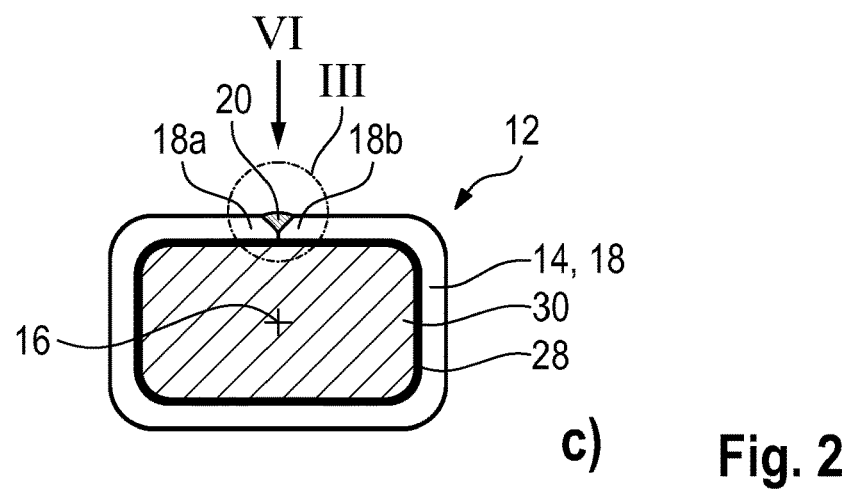

Corresponding to the alternatives shown in FIG. 2, the cylindrical housing 13 can have, for example, a circular (see FIG. 2a), an elliptical (see FIG. 2b) or a substantially rectangular (see FIG. 2c) footprint or cross-section.

Opposing ends 18a, 18b of the metal sheet 18 oriented substantially in the circumferential direction with respect to the cylinder axis 16 form a joint, which is connected with a weld seam 20.

The weld seam 20 has a spacing from an inner surface 22 of the housing jacket 14 which is greater than zero.

In the embodiments represented, the weld seam 20 is a laser weld seam.

In addition, one end 18a has a bevel 24a and the other end 18b has a bevel 24b.

These form an angle $\alpha_a$ and $\alpha_b$, respectively, which is at least 5°, with a plane of the housing jacket 14 running radially relative to the cylinder axis 16.

The bevels 24a, 24b face each other within the joint.

Figure 3:
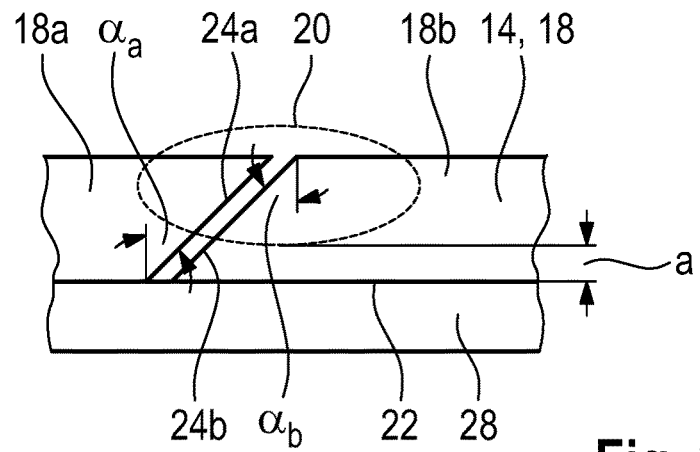
FIG. 3 shows a detail III of the exhaust system component from FIGS. 2 a)-c) according to an embodiment.
Figure 4:
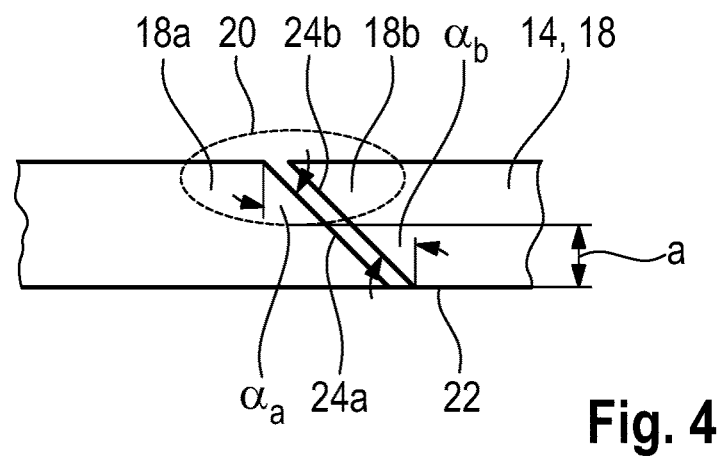
FIG. 4 is the detail III according to a further embodiment.
Figure 5:
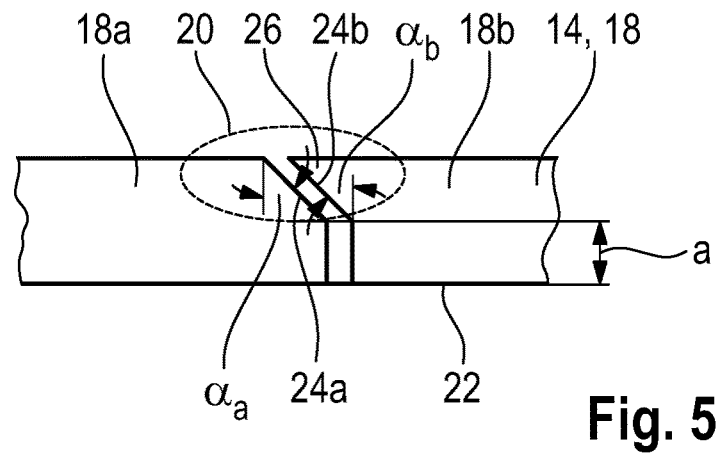
FIG. 5 is the detail III according to another embodiment.

A joint contour of the end 18a forms a negative contour of a joint contour of the end 18b and vice versa when the ends 18a, 18b are viewed along the cylinder axis 16 (see FIGS. 3-5).

The ends 18a, 18b therefore rest flat against each other.

An advantage of the bevels is that, when the jacket is closed, the mat is prevented from being jammed. For example, the "lower" end of the jacket can be closed first and then the "upper" end is closed. This ensures that the mat is not located in the gap between the two abutting faces.

In the embodiments according to FIGS. 3 and 4, the bevels 24a, 24b are chamfers oriented in opposition and running over the entire thickness of the metal sheet 18.

Alternatively, as represented in FIG. 5, one of the bevels, in the present case the bevel 24a, can be a chamfer running over only a part of the thickness of the metal sheet 18. The bevel facing this chamfer, in the present case the bevel 24b, is then arranged on a metal sheet extension 26. A thickness of the metal sheet extension 26 oriented radially with respect to the cylinder axis 16 substantially corresponds to a height of the chamfer, oriented radially with respect to the cylinder axis 16.

In all the embodiments, in the radial direction, the housing jacket 14 thus has a substantially constant thickness which corresponds to the sheet thickness.

Within the housing 13, a substrate 30 is held via a mounting mat 28.

The mounting mat 28 rests substantially flat against both the substrate 30 and the housing jacket 14 (see FIG. 2).

The arrangement of the mounting mat 28 on the substrate 30 is in particular implemented binder-free.

The substrate 30 is held in the housing 13 substantially by a radial compression force originating from the housing jacket 14. For this, in a dimension corresponding to the housing jacket circumference, the metal sheet 18 of the housing jacket 14 is individually adapted to the substrate 30. In other words, the metal sheet 18 is made to measure relative to the actual dimensions of the substrate 30.

Through welding of the two ends 18a, 18b of the metal sheet 18, which form the joints represented in FIGS. 3-5, a pre-defined radial compression force thereby forms.

The weld seam 20 runs over the entire axial length of the housing jacket 14.

Figure 6:
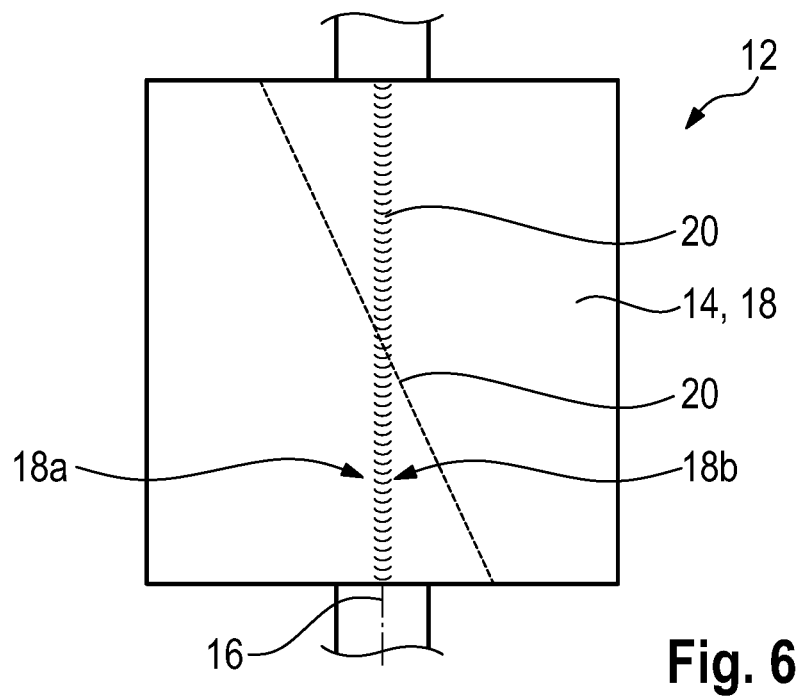
FIG. 6 shows a course of the weld seam of detail VI of an exhaust system component according to FIG. 1.

The weld seam 20 can run substantially along the cylinder axis 16 (see FIGS. 1 and 6).

As is drawn in with a dashed line in FIG. 6, the weld seam 20 can also run at an angle different from 0°, relative to the axial direction. If the weld seam 20 leads to erosion of the mat 28, this is not entirely in the direction of flow, with the result that there is no danger that the mat 28 will be continuously damaged at one point in the direction of flow.

Figure 7:
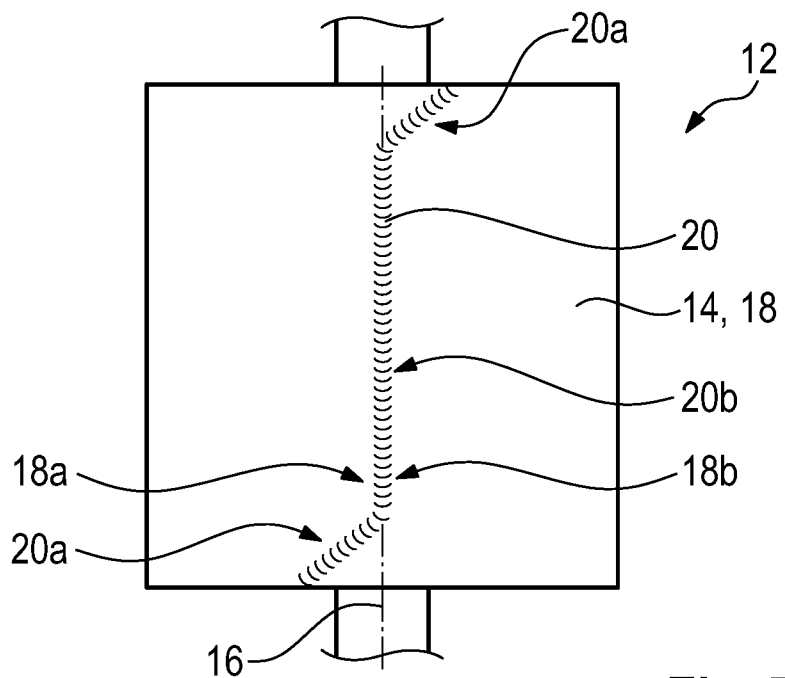
FIG. 7 shows an alternative course of the weld seam of an exhaust system component according to FIG. 1.

Alternatively, in an area 20a resting against an axial end of the housing jacket 14, the weld seam 20 can run inclined with respect to the cylinder axis 16 (see FIG. 7). In a central area 20b it can run substantially along the cylinder axis 16.

Through the configuration with areas 20a of the weld seam 20 running obliquely with respect to the cylinder axis 16, it is achieved that the housing jacket 14 is particularly stable in the area of its axial ends.

Figure 8:
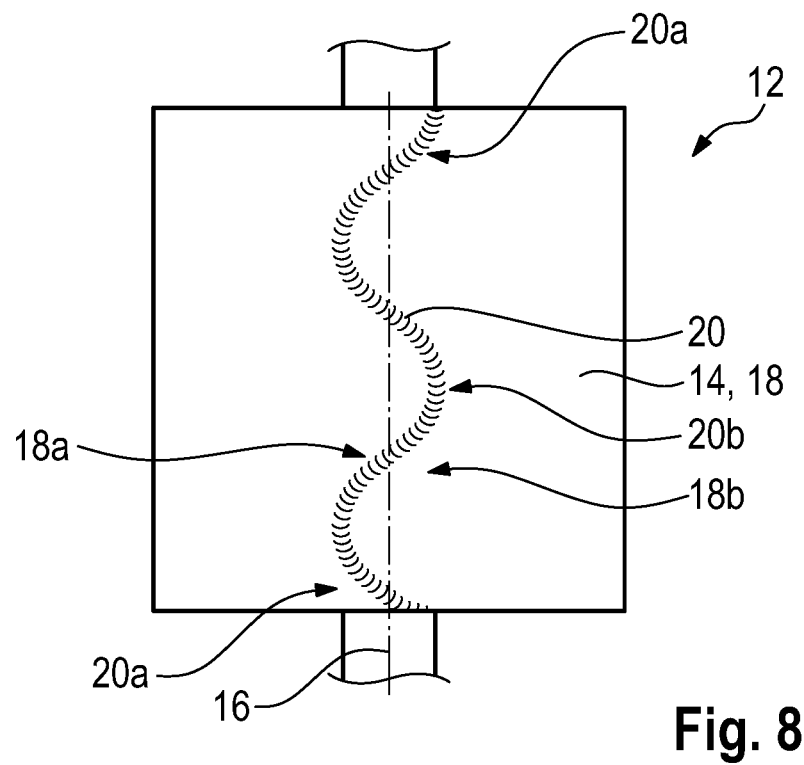
FIG. 8 shows another alternative course of the weld seam of an exhaust system component according to FIG. 1.

In a further alternative, the weld seam 20 runs substantially wave-shaped (see FIG. 8).

Also in this variant, the arrangement of the weld seam 20 on the housing jacket 14 can be chosen such that, in an area 20a resting against an axial end of the housing jacket 14, the weld seam 20 runs inclined with respect to the cylinder axis 16 (cf. also FIG. 7).

In a central area 20b, however, in contrast to the embodiment according to FIG. 7, the weld seam 20 does not run straight but is still wave-shaped.

A particularly stable housing jacket is thus created.

Figure 9:
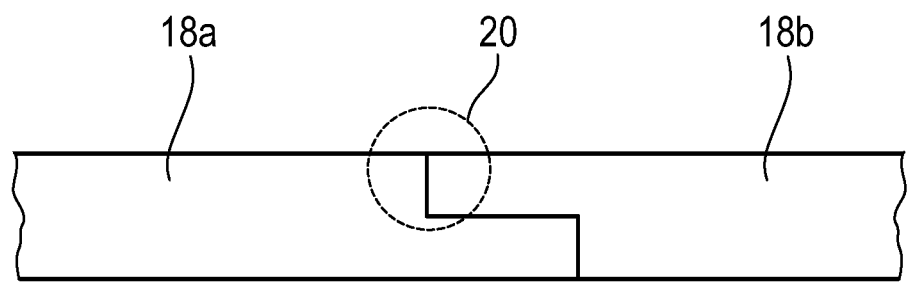
FIG. 9 shows a further embodiment with a stepped shape instead of a bevel.

In FIG. 9, a further embodiment is shown in which, instead of bevels at the ends of the jacket, stepped shapes are now used. This also fulfils the purpose of preventing damage to the mat 28 during welding.

The stepped shape with a horizontally running step can be produced with little expense by laser erosion. Here too the mat 28 is prevented from becoming jammed in the gap when the jacket 14 is closed.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An exhaust system component, in particular catalytic converter or particle filter, for an exhaust system of an internal combustion engine of a motor vehicle comprising:
   a substrate which is held in a substantially cylindrical housing, wherein the cylindrical housing has a housing jacket which comprises a metal sheet bent about a cylinder axis, and wherein ends of the metal sheet oriented in a circumferential direction relative to the cylinder axis form a joint connected with a weld seam; and
   wherein the weld seam extends over less than 90% of a thickness of the metal sheet and wherein the weld seam is spaced apart from an inner surface of the housing jacket and the ends each have a bevel or stepped shape at least in sections, wherein the bevels or stepped shapes face each other within the joint.

2. The exhaust system component of claim 1 wherein, viewed in an axial direction, a joint contour of one of the ends is a negative contour of a joint contour of the respective other end.

3. The exhaust system component of claim 1 wherein each of the bevels forms an angle of at least 5°, preferably of at least 10 and further preferably of at least 20°, with a radial plane of the housing jacket.

4. The exhaust system component of claim 1 wherein the bevels are chamfers oriented in opposition and running over an entire thickness of the metal sheet.

5. The exhaust system component of claim 1 wherein one of the bevels is a chamfer running over only a part of a thickness of the metal sheet.

6. The exhaust system component of claim 5 wherein the bevel facing the bevel formed as a chamfer is arranged on a metal sheet extension, in particular wherein a radial thickness of the metal sheet extension corresponds substantially to a radial height of the chamfer.

7. The exhaust system component of claim 1 wherein the stepped shapes are laser eroded.

8. The exhaust system component of claim 1 wherein the weld seam is a laser weld seam, in particular wherein the weld seam runs substantially over an entire axial length of the housing jacket.

9. The exhaust system component of claim 1 wherein the substrate is mounted on the housing jacket via a mounting mat, in particular wherein the mounting mat rests substantially flat against both the substrate and the housing jacket.

10. The exhaust system component of claim 9 wherein the mounting mat rests against the substrate interlayer-free, in particular binder-free.

11. The exhaust system component of claim 9 wherein, in a dimension corresponding to a housing jacket circumference, the metal sheet of the housing jacket is individually adapted to the mounting mat, in particular is individually adapted to a weight and/or a weight per unit area of the mounting mat.

12. The exhaust system component of claim 1 wherein, in a radial direction, the housing jacket has a substantially constant thickness, in particular wherein the constant thickness corresponds to a sheet thickness.

13. The exhaust system component of claim 1 wherein, in an area resting against an axial end of the housing jacket, the weld seam runs inclined with respect to the cylinder axis and/or, in a central area spaced apart from the axial ends of the housing jacket, runs substantially along the cylinder axis.

14. The exhaust system component of claim 1 wherein, at least in a central area, the weld seam runs at an angle different from 0°, relative to an axial direction.

15. The exhaust system component of claim 1 wherein, in a dimension corresponding to a housing jacket circumference, the metal sheet of the housing jacket is individually adapted to the substrate.

16. The exhaust system component of claim 1 wherein the substrate is held in the cylindrical housing substantially by a radial compression force originating from the housing jacket.

17. The exhaust system component of claim 1 wherein the weld seam extends from an upstream end to a downstream end of the housing jacket.

18. The exhaust system component of claim 17 wherein at least one portion of the weld seam runs parallel to the cylinder axis.

19. The exhaust system component of claim 17 wherein at least one portion of the weld seam runs non-parallel to the cylinder axis.

20. The exhaust system component of claim 17 wherein the weld seam is wave-shaped.

* * * * *